US012675294B2

(12) United States Patent
Lowes et al.

(10) Patent No.: US 12,675,294 B2
(45) Date of Patent: Jul. 7, 2026

(54) CONCURRENTLY FETCHING INSTRUCTIONS FOR MULTIPLE DECODE CLUSTERS

(71) Applicant: Intel Corporation, Santa Clara, CA (US)

(72) Inventors: Mathew Lowes, Austin, TX (US); Martin Licht, Round Rock, TX (US); Jonathan Combs, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/840,029

(22) Filed: Jun. 14, 2022

(65) Prior Publication Data

US 2023/0401067 A1 Dec. 14, 2023

(51) Int. Cl.
*G06F 9/38* (2018.01)
*G06F 9/30* (2018.01)
(52) U.S. Cl.
CPC ........ *G06F 9/3806* (2013.01); *G06F 9/30058* (2013.01); *G06F 9/3016* (2013.01)
(58) Field of Classification Search
CPC ................................................... G06F 9/3806
See application file for complete search history.

(56) References Cited

U.S. PATENT DOCUMENTS

| | | | | |
|---|---|---|---|---|
| 2008/0276069 A1* | 11/2008 | Blaner | ................. | G06F 9/3861 712/205 |
| 2009/0119494 A1* | 5/2009 | Blaner | ................. | G06F 9/3013 712/E9.045 |
| 2013/0067202 A1* | 3/2013 | Henry | ................. | G06F 9/30174 712/E9.016 |
| 2020/0285477 A1* | 9/2020 | Winrow | ................. | G06F 9/3846 |
| 2022/0100519 A1* | 3/2022 | Cohen | ................. | G06F 9/3867 |

OTHER PUBLICATIONS

Mathew Lowes, U.S. Appl. No. 17/352,671, filed Jun. 21, 2021, entitled Count to Empty for Microarchitectural Return Predictor Security, 78 pgs.
Sundararajan Ramakrishnan, U.S. Appl. No. 17/484,969, filed Sep. 24, 2021, entitled Scalable Toggle Point Control Circuitry for a Clustered Decode Pipeline, 79 pgs.

* cited by examiner

*Primary Examiner* — Michael J Metzger
(74) *Attorney, Agent, or Firm* — Nicholson De Vos Webster & Elliott LLP

(57) ABSTRACT

In one embodiment, an apparatus comprises: a branch prediction circuit to predict whether a branch is to be taken; a fetch circuit, in a single fetch cycle, to send a first portion of a fetch region of instructions to a first decode cluster and send a second portion of the fetch region to the second decode cluster; the first decode cluster comprising a first plurality of decode circuits to decode one or more instructions in the first portion of the fetch region; and the second decode cluster comprising a second plurality of decode circuits to decode one or more other instructions in the second portion of the fetch region. Other embodiments are described and claimed.

14 Claims, 11 Drawing Sheets

100

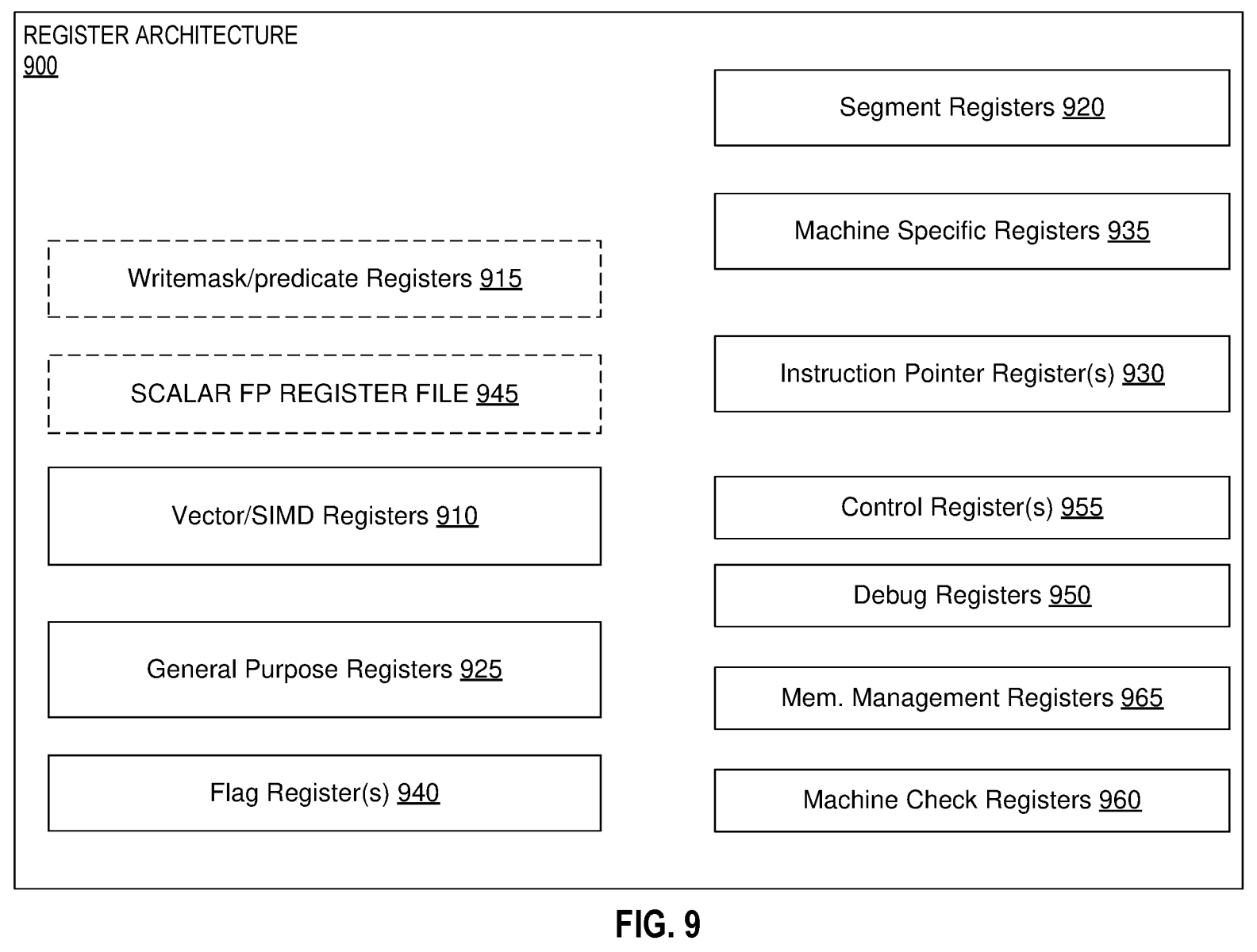

REGISTER ARCHITECTURE 900

Segment Registers 920

Machine Specific Registers 935

Instruction Pointer Register(s) 930

Control Register(s) 955

Debug Registers 950

Mem. Management Registers 965

Machine Check Registers 960

Writemask/predicate Registers 915

SCALAR FP REGISTER FILE 945

Vector/SIMD Registers 910

General Purpose Registers 925

Flag Register(s) 940

FIG. 9

CONCURRENTLY FETCHING INSTRUCTIONS FOR MULTIPLE DECODE CLUSTERS

BACKGROUND

In a processor pipeline, instructions are fetched and provided to a decoder for decoding. During instruction fetch, one limiting factor of performance can result in having to stop fetching of an instruction stream upon encountering a prediction of a taken branch. This limitation reduces the width of a stream of instructions that can be achieved at one time, and thus increases the number of cycles incurred in fetching an entire stream.

BRIEF DESCRIPTION OF THE DRAWINGS

FIG. 9 is a block diagram of a register architecture according to some examples.

DETAILED DESCRIPTION

In various embodiments, instruction decode capabilities of a processor may be increased by providing different portions of an instruction stream to a given one of multiple decode clusters within a single fetch cycle. In this way, a higher rate of instruction decoding may be realized while reducing complexity. As will be described further herein, branch prediction circuitry that provides prediction information that is used to fetch instruction streams can provide multiple predicted branches within a given instruction stream, such that different portions of the instruction stream may be provided to the different decode clusters.

In one or more embodiments, a branch operation is either unconditional (e.g., the branch is taken every time the instruction is executed) or conditional (e.g., the direction taken for the branch is dependent upon a condition). A conditional branch may occur where instructions to be executed following a conditional branch (e.g., conditional jump) are not known with certainty until the condition upon which the branch depends is resolved.

In one or more embodiments, multiple taken branches (e.g., conditional branches) may be predicted and respective code streams can be sent to multiple decode clusters in a single fetch cycle. In an particular implementation, branches being written into a branch target buffer (BTB) or other branch prediction circuitry may be analyzed to determine at that time whether the branch meets one or more conditions to be "double predicted." At a later time at which the prediction circuitry is read, if the state of a fetch circuit meets certain restrictions, then the double prediction is performed. In this way, processor performance, e.g., in terms of instructions per cycle (IPC), may be improved. Furthermore, power consumption may be reduced by allowing multiple branches to be predicted in a single fetch cycle (particularly where a code stream includes branches that jump a short distance), thereby reducing the total number of fetches to retrieve a given stream of instructions.

Figure 1:
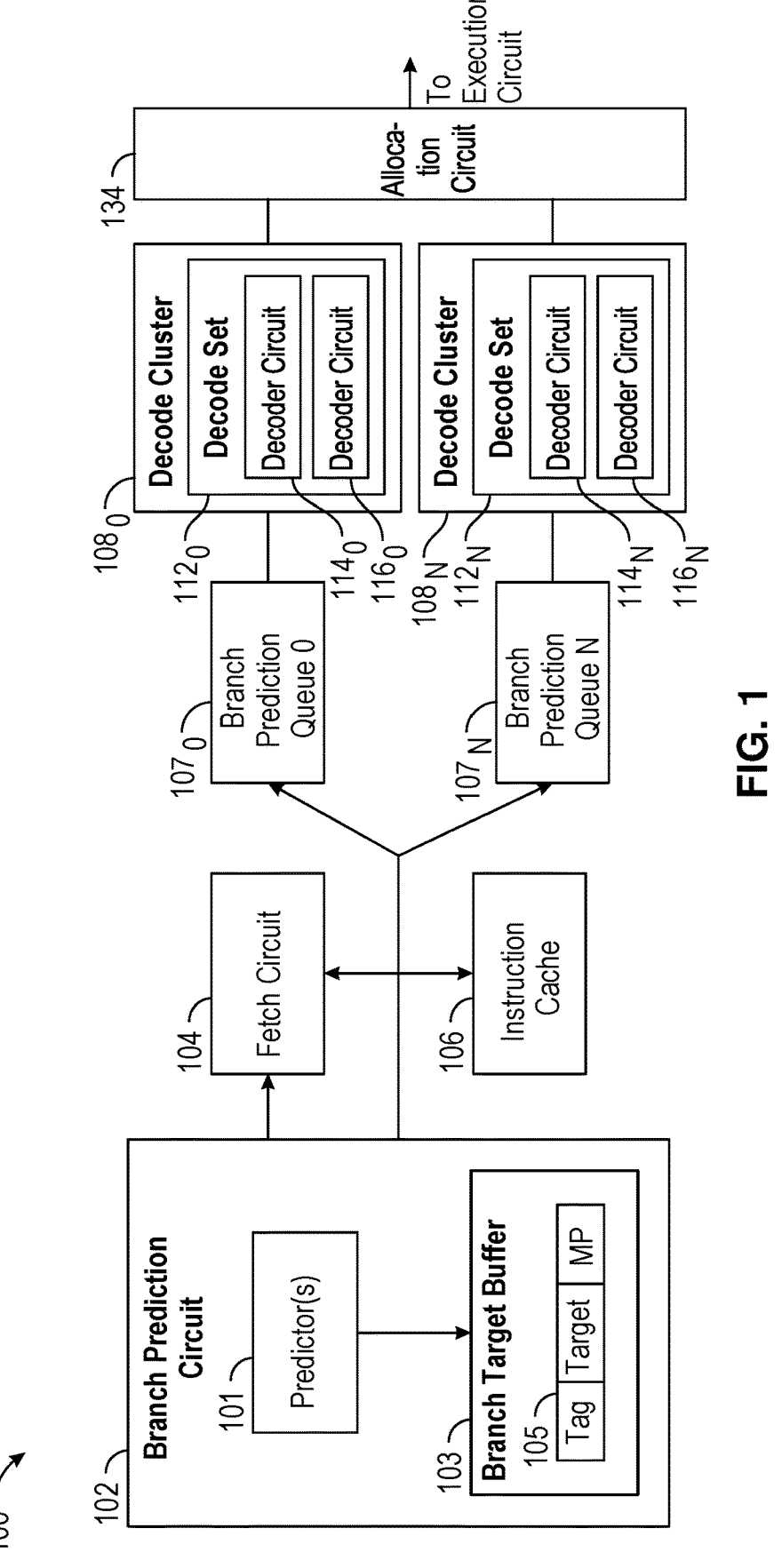
FIG. 1 is a block diagram of a portion of a processor core in accordance with an embodiment.

Referring now to FIG. 1, shown is a block diagram of a portion of a processor core in accordance with an embodiment. As shown in FIG. 1, processor core 100 is seen at a high level including various front end circuitry that is responsible for fetching instructions, predicting branches within an instruction stream and providing fetched instructions to decode circuitry. In turn, the decode circuitry may decode the instructions, which may be macro-instructions, into one or more smaller instructions, commonly referred to as micro-operations or pops. In turn, these decoded instructions, e.g., in the form of decoded pops, may be provided to allocation circuitry. The allocation circuitry may be configured to identify needed resources for execution, and when such resources are available, to schedule execution of the pops on a given execution unit included within an execution circuit.

As shown in FIG. 1, a branch prediction circuit 102 includes one or more predictors 101 and a branch target buffer (BTB) 103 that may store a plurality of entries, a representative entry 105 being shown in FIG. 1. Predictors 101 may be configured to predict whether a given branch in program code is to be taken or not taken. Upon a determination of a valid prediction of a taken branch, information regarding the prediction may be stored in a corresponding entry 105 of BTB 103, which is configured to store information regarding predicted branches.

In one or more embodiments, branch prediction circuit 102 predicts a target instruction for a branch instruction. BTB 103 may thereafter be updated with the target instruction for a branch instruction Thus branch prediction circuit 102 may be leveraged to provide a branch prediction, rather than waiting until a condition is resolved. This branch prediction may indicate whether the branch will be taken or not taken and/or (e.g., if predicted to be taken) predict the target instruction (e.g., target address) for the branch. In one or more embodiments, if the branch is predicted to be taken, core 100 fetches and speculatively executes the instruction(s) for the taken direction of the branch, e.g., the instructions found at the predicted branch target address. The instructions executed following the branch prediction are speculative where core 100 has not yet determined whether the prediction is correct.

Still with reference to FIG. 1, a representative entry 105 in BTB 103 is illustrated. As shown, entry 105 includes a tag field that is configured to store at least a portion of an instruction pointer (e.g., memory address) identifying a branch instruction. Entry 105 further includes a target field to store at least a portion of an instruction pointer for the target of the branch instruction identified in the tag field of the same entry.

Additional metadata regarding the branch may be stored in one or more other fields of entry 105. For purposes of discussion herein, one such field is referred to as a double prediction field (more generally a multiple prediction (MP) field), which may store a single bit to indicate whether the branch instruction is located in a fetch region that has a valid double prediction. In the case where branch instructions are determined not to meet the criteria, a single prediction indicator may be set. In other cases, rather than having separate fields for single and multiple predictions, there may be just a single field which, when set, indicates that the branch instruction is of a fetch region having multiple predicted branches. Conversely when reset, this single field indicates that the branch instruction is of a fetch region not having such double predicted branches (or at least not to be handled as a double prediction instance). While described with these particular fields, a given BTB may have entries that include additional information such as an extra copy of the target offset (e.g., a number of least significant bits of the linear address). Although embodiments are not limited in this regard, in one or more embodiments a fetch region may be between 32 and 256 bytes.

In one or more embodiments, core 100 resolves branch instructions at the back end of a pipeline, e.g., in execution circuitry and/or retirement circuitry. If a branch instruction is determined to not be taken by the processor, then all instructions (e.g., and their data) presently in the pipeline circuitry behind the taken branch instruction are flushed. Branch prediction circuit 102 may be configured to learn from past behavior of branches to predict a next (e.g., incoming) branch.

Still referring to FIG. 1, a fetch circuit 104 is coupled to branch prediction circuit 102 and may be configured to fetch instructions based at least in part on branch predictions. Such instructions already may be stored in an instruction cache 106, or they may be obtained from a further portion of a memory hierarchy (not shown for ease of illustration in FIG. 1). Instruction cache 106 may store one or more instructions without having to load them from memory. In one or more embodiments, fetch circuit 104 sends code blocks to a given one of respective decode cluster via instruction cache 106. Instruction cache 106 may include an instruction cache tag and/or instruction translation lookaside buffer (TLB).

Fetch circuit 104 may divide code into individual blocks (e.g., of a set of contiguous instructions from a program), based at least in part on indications of branches as described herein. The individual code blocks may then be sent to respective decode clusters for decoding. While embodiments may write to the different decode clusters 108 in a round-robin order, in other implementations the decode clusters may be written in any order. In one or more embodiments fetch circuit 104 may generate a stream of undecoded instructions such as via instruction pointer values in a block of instructions in program order and direct them to a given one of multiple decode clusters 108A-108B until a toggle point is identified, e.g., in response to a double predict indicator.

Based at least on branch predictions, fetched instructions within an instruction stream may be stored in one of multiple branch prediction queues 1070-N. As seen, each branch prediction queue 107 is associated with a corresponding decode cluster 1080-N. By providing multiple decode clusters (and corresponding branch prediction queues (BPQs)), decode width may be increased, since instruction information may be provided in parallel to multiple decode clusters within a single fetch cycle. Decode clusters 108 may be configured to function out of order, with branch predictions creating toggle points between the clusters that ensure a known start point in a code stream for decoder circuitry within each decode cluster. For ease of illustration, two decode clusters 108 are shown; of course, in other embodiments there may be three or more decode clusters provided.

With embodiments herein, the instruction information provided may identify appropriate instruction start locations within a fetch region. Thus in embodiments, different portions of a given fetch region may be provided, in certain cases, to separate branch prediction queues 107 and thereafter to separate decode clusters 108 to increase decode width. More specifically for each taken branch, the BPQ written to is rotated around the decode clusters in order. From this point, decode clusters 108 can function out of order, until they are reordered between decode and allocation stages. In one or more embodiments, two (or more up to the number of clusters) toggle operations may occur in a single fetch cycle based on predicted taken branches.

Still referring to FIG. 1, decode clusters 108 may be configured with a set of decoders 1120-N, each of which may include multiple decoder circuits 1140-N and decoder circuits 1160-N. As examples, these different decoder circuits may be configured to decode different lengths or types of instructions. For example, instruction decoder circuits 114, 116 may be configured to decode different basic blocks of code out-of-order with respect to each other. In one or more embodiments, at least one of decode clusters 108 may include three (or more) decoder circuits, e.g., three decode clusters each having three decoder circuits for a nine-wide decode total.

Decode clusters 108 may decode code blocks in parallel (e.g., via the parallel decoder circuits therein), as decoder circuits 114, 116 and/or decode clusters 108 operate independently of each other, so the blocks of code can be decoded out-of-order (e.g., out of program order). Decoder circuits 114, 116 may be configured to decode a macro-instruction into a set of one or more pops for execution, either with or without using a microcode sequencer.

After decoding macro-instructions into decoded pops, the pops are provided to an allocation circuit 134, where they may be re-combined. In one or more embodiments, allocation circuit 134 is responsible for allocating the pops to execution circuitry in the proper program order. While not shown in FIG. 1, decoded instructions, e.g., in the form of respective pops, may be stored in an instruction decode queue. In one or more embodiments, allocation circuit 134 may send micro-operations from such instruction decode queues, e.g., in program order to execution circuitry. Understand while shown at this high level in the embodiment of FIG. 1, many variations and alternatives are possible.

As discussed above, in one or more embodiments multiple toggle operations may occur to provide different portions of a fetch region to different decode clusters in a single fetch cycle. To enable such operation, certain criteria regarding these fetch regions are first to be identified. Such identification may occur at allocation time when branches are allocated into a branch target buffer.

Figure 2:
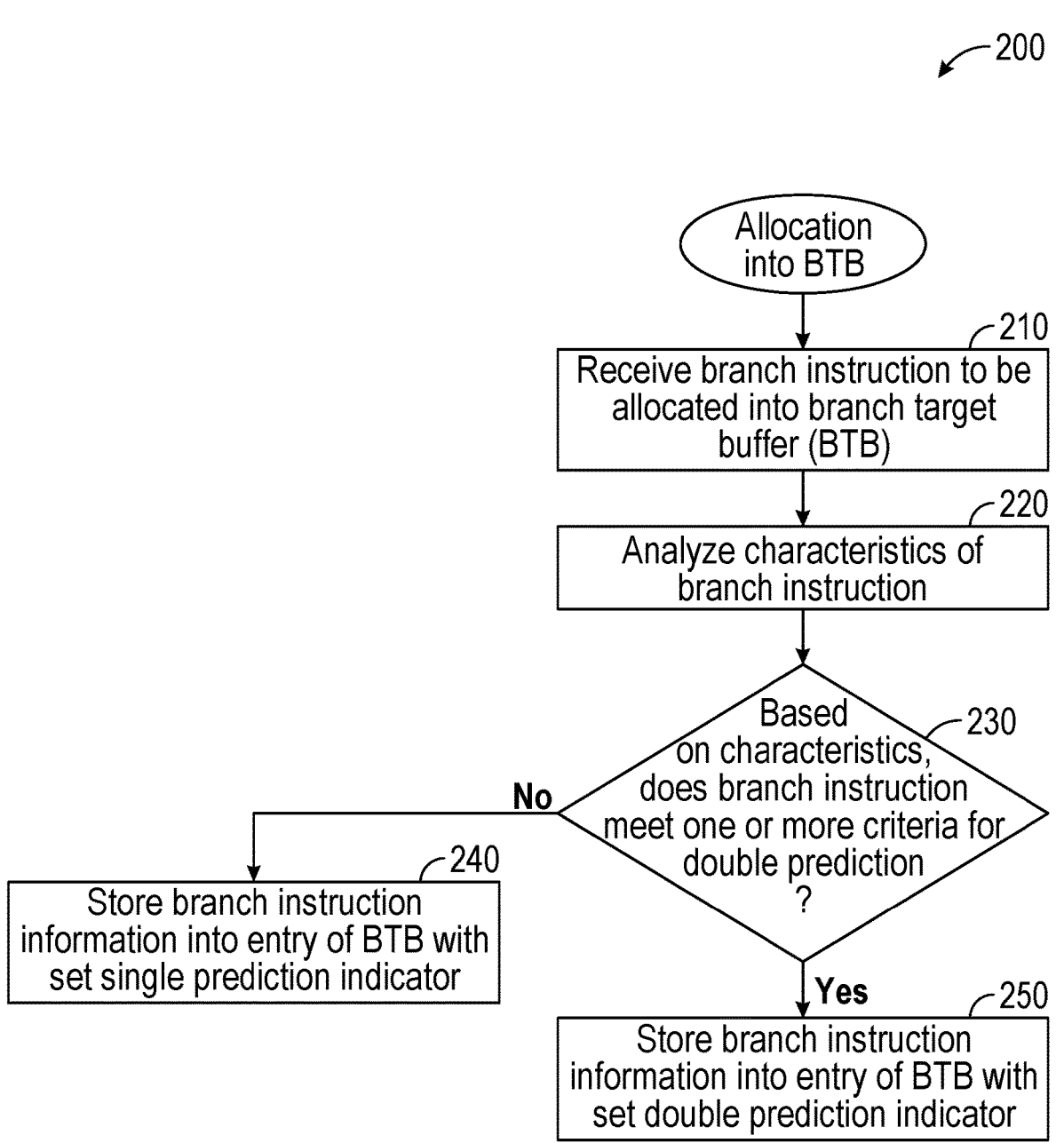
FIG. 2 is a flow diagram of a method in accordance with an embodiment.

Referring now to FIG. 2, shown is flow diagram of a method in accordance with an embodiment. More specifically, method 200 of FIG. 2 is a method for allocating branches into a branch target buffer. As such, method 200 may be performed by hardware control circuitry included in or associated with a branch target buffer and/or branch prediction circuit, alone or in combination with firmware and/or software.

As illustrated, method 200 begins by receiving a branch instruction to be allocated into the BTB (block 210). As an example, such branch instruction may be received upon a determination of a correct prediction, either at decode time for direct unconditional branches or when the branch is resolved for indirect and conditional branches. In other cases, conditional branches may be allocated earlier than resolution time, e.g., at decode time or based on a prediction vector passed down the machine. Next at block 220, characteristics of the branch instruction may be analyzed. Although embodiments are not limited in this regard, such characteristics may include a determination of a distance between the instruction and a target of the branch.

Still referring to FIG. 2, next at diamond 230, it may be determined whether the branch instruction meets one or more criteria for a valid double prediction. Such determination may occur based on the analyzed characteristics. In one embodiment, these criteria may include one or more of the following: a target of a branch is within the same code region (e.g., 1*k* region) as a start point; a target of a branch is within a 128 byte region; a branch does not jump forward over another branch with the same tag, or if backward, there is another branch of the same tag before the branch being written; there is no other double predicted branch with the same tag within a BTB update read region. Note that in an embodiment, the criteria to be considered may be selected to minimize the hardware cost at fetch time. By doing these checks at BTB write time, there is no timing criticality.

If it is determined that the instruction does not meet such criteria, control passes to block 240. There branch instruction information may be stored into an entry of the BTB. For example, a portion of an address of the instruction, e.g., a tag, may be stored in a tag field of an entry. In turn, information of a target of the branch may be stored in a target field. For example, a portion of the target address may be stored in this target field.

Still with reference to FIG. 2, instead when the criteria are met for the double prediction, control passes to block 250. There, the branch instruction information may be stored into an entry of the BTB with a set double prediction indicator. Thus at this point, the BTB includes an entry for the branch instruction, such that on a prediction of this taken branch, information from the BTB may be used to provide a target for the branch.

Figure 3:
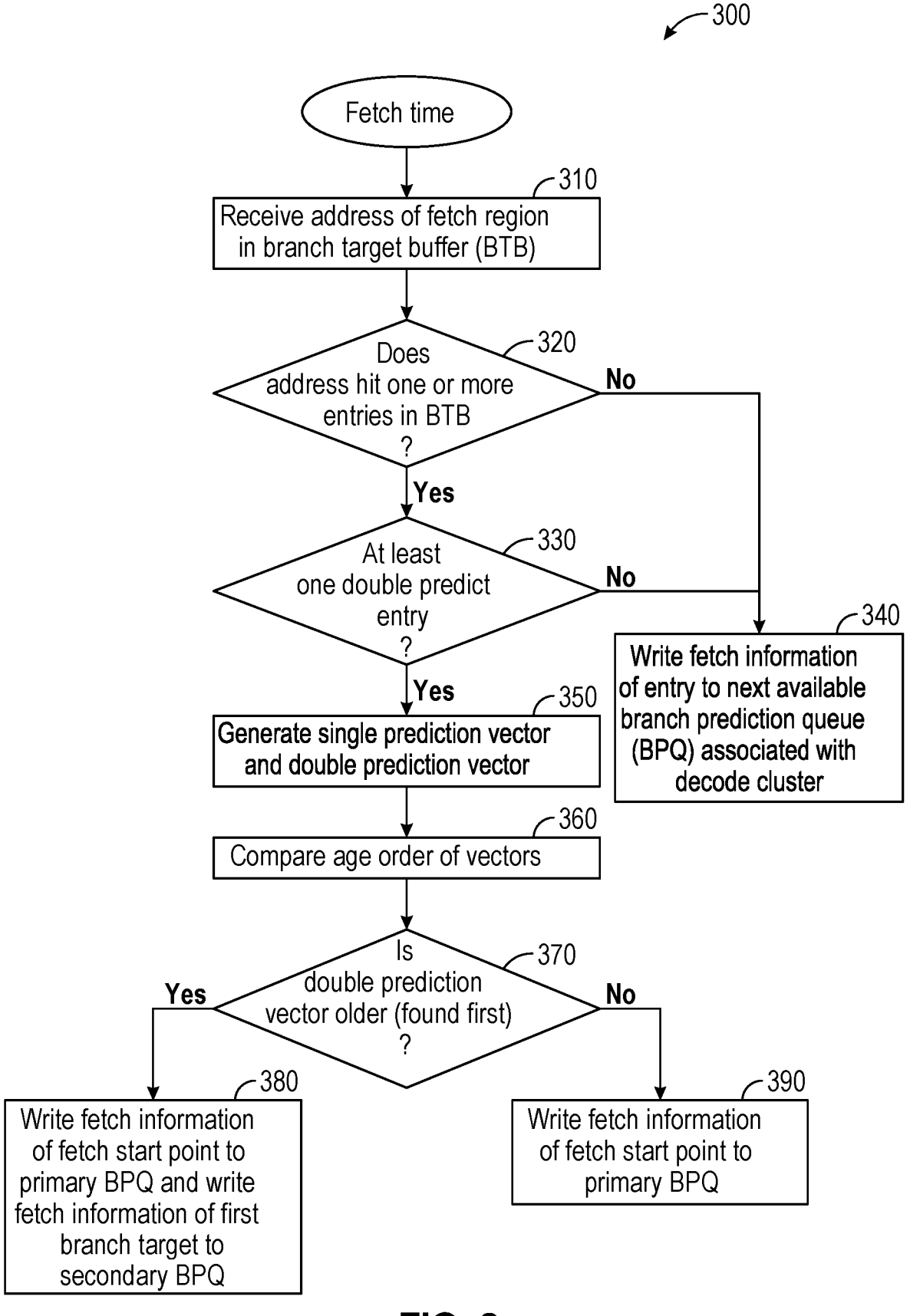
FIG. 3 is a flow diagram of a method in accordance with another embodiment.

The BTB may be accessed at fetch time to identify whether predicted branches are present and if so to obtain target information. Referring now to FIG. 3, shown is a flow diagram of another method in accordance with an embodiment. As shown in FIG. 3, method 300 is a method for using a BTB to enable multiple predictions to be sent to separate decode clusters in a single fetch cycle. As such, method 300 may be performed by hardware control circuitry included in or associated with a branch target buffer, alone or in combination with firmware and/or software.

As illustrated, method 300 begins by receiving within the BTB an address of a fetch region (block 310). Next it may be determined whether the address hits in one or more entries of the BTB (diamond 320). Such determination may be based on a portion of a fetch region address, to determine whether the fetch region address portion matches any of the tags present in the BTB. The lack of a taken prediction from the BTB (either no tag matches or any tag matches that do occur are conditional branches predicted not taken) causes a fetch circuit to continue sequentially to the next fetch region in the next fetch cycle. Thus as shown in FIG. 3, control in this case passes to block 340 where fetch information for this fetch region is written to a next available BPQ associated with a decode cluster.

Still referring to FIG. 3, on determination of a hit, control passes to diamond 330 where it may be determined whether the hit entry or entries includes at least one double predict entry. If not, control passes to block 340, where fetch information from the entry may be written to the next available BPQ. As discussed above, in various implementations there may be multiple BPQs each associated with a single decode cluster. In some cases, there may be a pointer to indicate which is the next available BPQ. Other techniques to identify the appropriate BPQ in which to store the fetch information may be used. In an embodiment, this fetch information may include an indication of a start point of a fetch (which may correspond to a start of a target instruction) and ends at a BTB predicted last byte of a taken branch instruction as its endpoint.

Still with reference to FIG. 3, instead if it is determined at diamond 330 that there is at least one double predict entry, control passes to block 350 where, from this entry, a single prediction vector and a double prediction vector may be generated. In an embodiment, these different versions of the hit vector both relate to all the ways in the same set of the BTB: one version is only branches that are marked as double predictable and the other version is only branches that are not marked as double predictable. Thus when branch predictors are read, and if the conditions allow a double prediction, there is an added qualification to a per way compare that creates two final versions of a hit vector: one for only double predict-eligible entries and one for non-double predict-eligible entries. Thus in parallel a normal prediction and a double prediction are created.

Next at block 360, the age order of these two vectors may be compared. Based on this comparison, it is determined at diamond 370 whether the double prediction vector is older than the single prediction vector: in other words, whether this double prediction is earlier in the fetch region. If so, control passes to block 380. At block 380, fetch information of the fetch start point may be written to a primary BPQ and fetch information of a first branch target of this first (double) prediction may be written to a secondary BPQ. Understand while termed "primary" and "secondary," in some cases the fetch start point may be written to the next available BPQ and the fetch information of the first branch target written to a following available BPQ. Stated another way, the primary decode cluster is the one that the fetch started pointed at for that fetch cycle, and fetched information is guaranteed to be written into that cluster's BPQ. Then depending on if a valid double predict entry is encountered, the secondary BPQ may also be written to during the fetch cycle.

If the double prediction is found first, then that fetch is written into two BPQs concurrently. In one example, the primary decode cluster receives a first portion of a fetch region where the start of the fetch region is its start point, and the end of the first branch instruction is its endpoint, which is referred to as the double predicted branch. The secondary decode cluster is provided a second portion of the fetch region that starts on the target of the first branch and ends with either the end of the first non-double branch detected, or the end of the fetch region if there is no other branch. The next fetch cycle's instruction pointer is redirected to the target of the second branch, or to the sequential address of the fetch region if there is no second branch.

Finally, if instead it is determined at diamond 370 that the double prediction vector is not older, control passes to block 390, where fetch information of the fetch start point may be written to the primary BPQ. Understand while shown at this high level in the embodiment of FIG. 3, many variations and alternatives are possible.

Figures 4A, 4B:
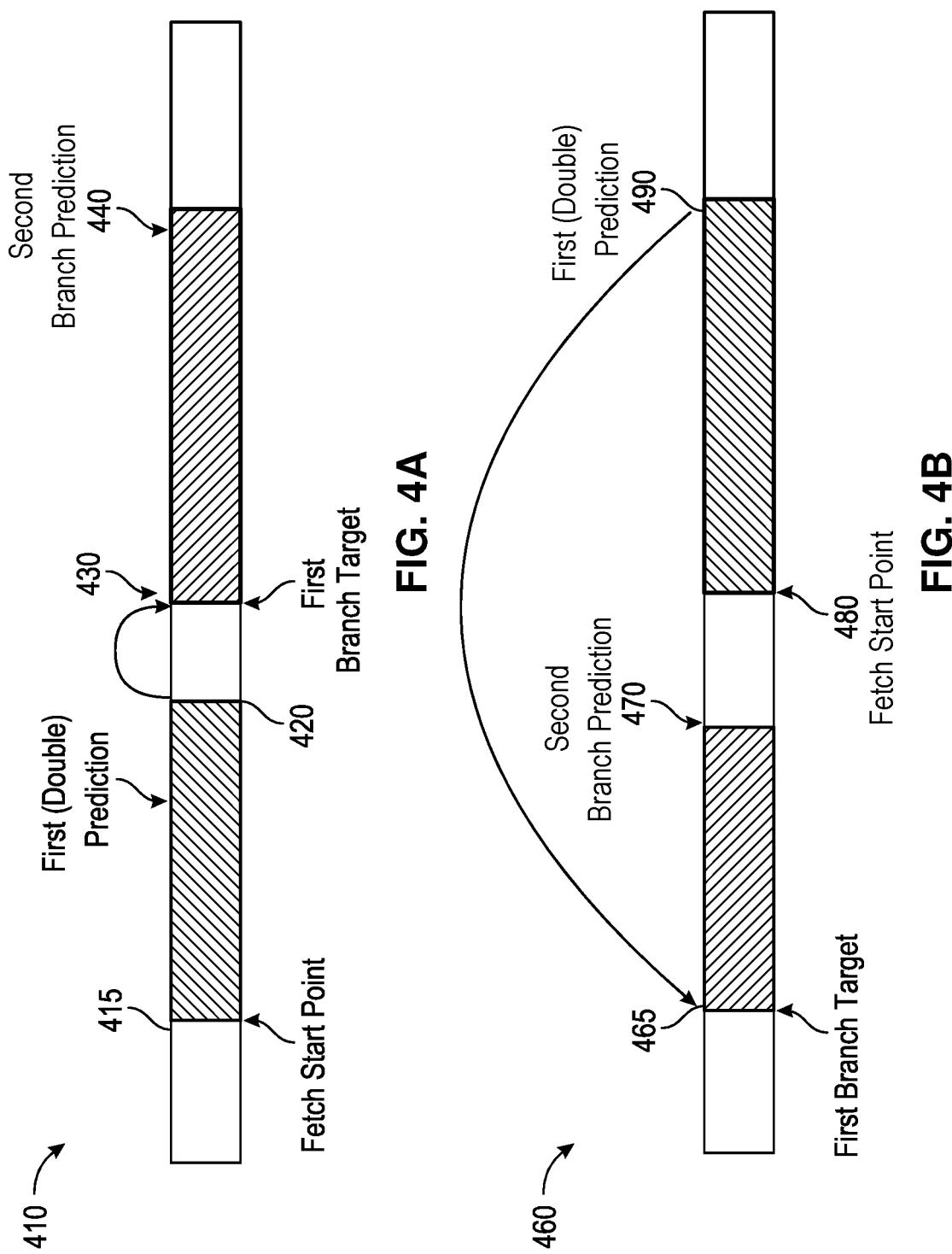
FIGS. 4A and 4B illustrate multiple branch prediction in a fetch region in accordance with an embodiment.

Referring now to FIG. 4A, shown is an example of a fetch of a code region having multiple predicted branches. As shown in FIG. 4A, a fetch region 410 includes a fetch start point 415. Fetch region 410 includes a first (double) prediction 420 that targets a first branch target 430. Later in fetch region 410, a second branch prediction 440 is present. With this arrangement having a short forward branch, a multiple predict indicator within a BTB entry may be set to enable portions of this fetch region to be sent to two different decode clusters, namely the highlighted portions shown in FIG. 4A.

Referring now to FIG. 4B, shown is another example of a fetch of a code region having multiple predictions. As shown in FIG. 4B, fetch region 460 includes a fetch start point 480. Fetch region 460 includes a first (double) prediction 490 that targets a first branch target 465 and is thus a backward branch. Still in fetch region 460, a second branch prediction 470 is present. With this arrangement having a short backward branch, a multiple predict indicator within a BTB entry may be set to enable portions of this fetch region to be sent to two different decode clusters.

In one or more implementations, both conditional branches and unconditional direct branches may be supported. To further reduce hardware requirements and complexity, any branch marked as double predicted eligible may not be used for calculation of a stew used for history-based branch predictors. Conditional branches that are double predicted do not use the stew-based branch predictors. If those conditional branches ever mispredict to a non-taken direction, then they are no longer marked as double predict eligible, and can resume using stew-based predictors.

Using an embodiment, a performance bottleneck may be resolved by predicting multiple taken branches in a single cycle, with minimal hardware cost as an existing BTB can be leveraged. In addition, the number of fetch cycles for fetching a given code stream may be reduced, increasing the performance and reducing the energy consumed by the core. Exemplary Computer Architectures.

Detailed below are describes of exemplary computer architectures. Other system designs and configurations known in the arts for laptop, desktop, and handheld personal computers (PC)s, personal digital assistants, engineering workstations, servers, disaggregated servers, network devices, network hubs, switches, routers, embedded processors, digital signal processors (DSPs), graphics devices, video game devices, set-top boxes, micro controllers, cell phones, portable media players, hand-held devices, and various other electronic devices, are also suitable. In general, a variety of systems or electronic devices capable of incorporating a processor and/or other execution logic as disclosed herein are generally suitable.

Figure 5:
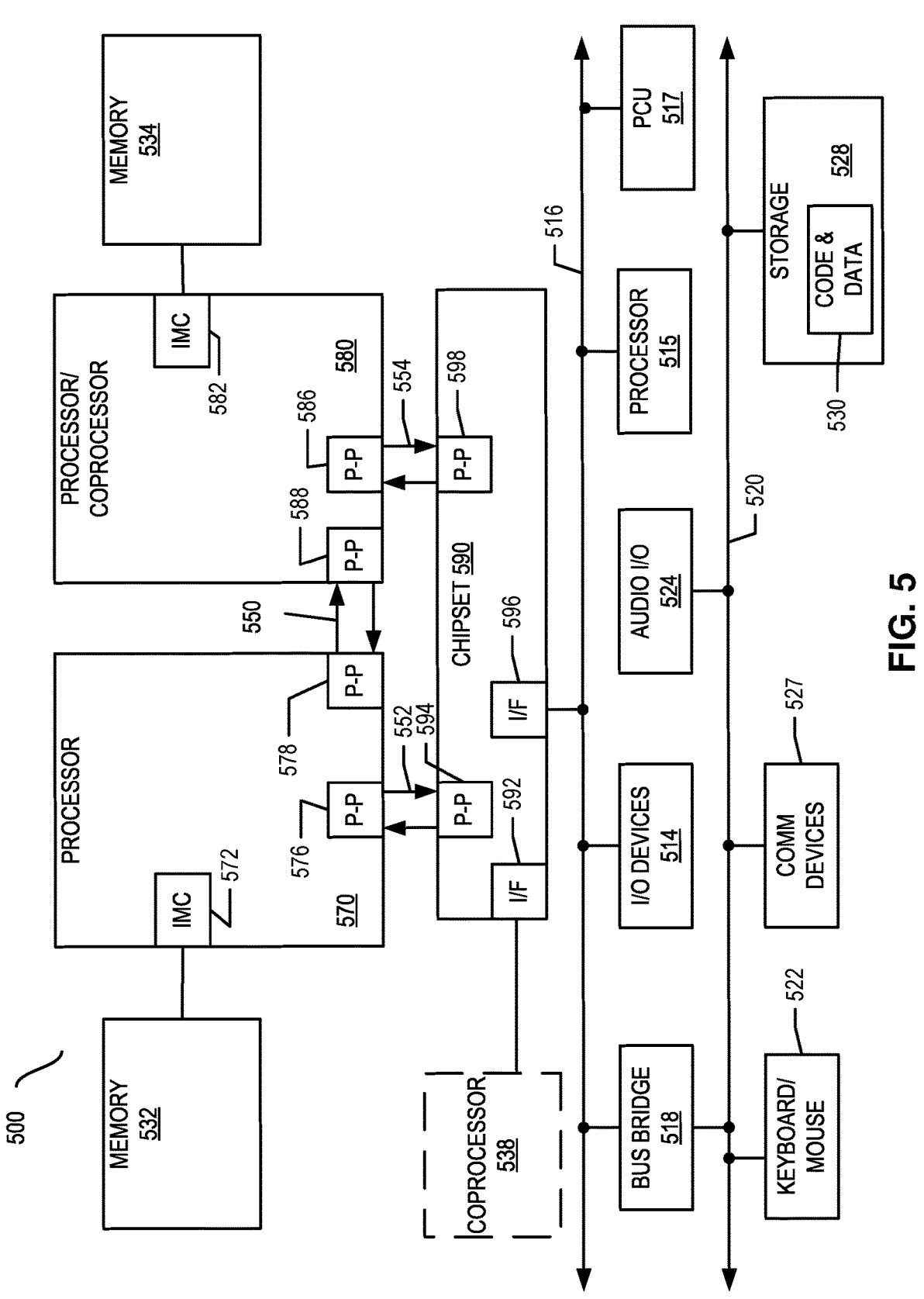
FIG. 5 illustrates an exemplary system.

FIG. 5 illustrates an exemplary system. Multiprocessor system 500 is a point-to-point interconnect system and includes a plurality of processors including a first processor 570 and a second processor 580 coupled via a point-to-point interconnect 550. In some examples, the first processor 570 and the second processor 580 are homogeneous. In some examples, first processor 570 and the second processor 580 are heterogenous. Though the exemplary system 500 is shown to have two processors, the system may have three or more processors, or may be a single processor system.

Processors 570 and 580 are shown including integrated memory controller (IMC) circuitry 572 and 582, respectively. Processor 570 also includes as part of its interconnect controller point-to-point (P-P) interfaces 576 and 578; similarly, second processor 580 includes P-P interfaces 586 and 588. Processors 570, 580 may exchange information via the point-to-point (P-P) interconnect 550 using P-P interface circuits 578, 588. IMCs 572 and 582 couple the processors 570, 580 to respective memories, namely a memory 532 and a memory 534, which may be portions of main memory locally attached to the respective processors.

Processors 570, 580 may each exchange information with a chipset 590 via individual P-P interconnects 552, 554 using point to point interface circuits 576, 594, 586, 598. Chipset 590 may optionally exchange information with a coprocessor 538 via an interface 592. In some examples, the coprocessor 538 is a special-purpose processor, such as, for example, a high-throughput processor, a network or communication processor, compression engine, graphics processor, general purpose graphics processing unit (GPGPU), neural-network processing unit (NPU), embedded processor, or the like.

A shared cache (not shown) may be included in either processor 570, 580 or outside of both processors, yet connected with the processors via P-P interconnect, such that either or both processors' local cache information may be stored in the shared cache if a processor is placed into a low power mode.

Chipset 590 may be coupled to a first interconnect 516 via an interface 596. In some examples, first interconnect 516 may be a Peripheral Component Interconnect (PCI) interconnect, or an interconnect such as a PCI Express interconnect or another I/O interconnect. In some examples, one of the interconnects couples to a power control unit (PCU) 517, which may include circuitry, software, and/or firmware to perform power management operations with regard to the processors 570, 580 and/or co-processor 538. PCU 517 provides control information to a voltage regulator (not shown) to cause the voltage regulator to generate the appropriate regulated voltage. PCU 517 also provides control information to control the operating voltage generated. In various examples, PCU 517 may include a variety of power management logic units (circuitry) to perform hardware-based power management. Such power management may be wholly processor controlled (e.g., by various processor hardware, and which may be triggered by workload and/or power, thermal or other processor constraints) and/or the power management may be performed responsive to external sources (such as a platform or power management source or system software).

PCU 517 is illustrated as being present as logic separate from the processor 570 and/or processor 580. In other cases, PCU 517 may execute on a given one or more of cores (not shown) of processor 570 or 580. In some cases, PCU 517 may be implemented as a microcontroller (dedicated or general-purpose) or other control logic configured to execute its own dedicated power management code, sometimes referred to as P-code. In yet other examples, power management operations to be performed by PCU 517 may be implemented externally to a processor, such as by way of a separate power management integrated circuit (PMIC) or another component external to the processor. In yet other examples, power management operations to be performed by PCU 517 may be implemented within BIOS or other system software.

Various I/O devices 514 may be coupled to first interconnect 516, along with a bus bridge 518 which couples first interconnect 516 to a second interconnect 520. In some examples, one or more additional processor(s) 515, such as coprocessors, high-throughput many integrated core (MIC)

processors, GPGPUs, accelerators (such as graphics accelerators or digital signal processing (DSP) units), field programmable gate arrays (FPGAs), or any other processor, are coupled to first interconnect 516. In some examples, second interconnect 520 may be a low pin count (LPC) interconnect. Various devices may be coupled to second interconnect 520 including, for example, a keyboard and/or mouse 522, communication devices 527 and a storage circuitry 528. Storage circuitry 528 may be one or more non-transitory machine-readable storage media as described below, such as a disk drive or other mass storage device which may include instructions/code and data 530. Further, an audio I/O 524 may be coupled to second interconnect 520. Note that other architectures than the point-to-point architecture described above are possible. For example, instead of the point-to-point architecture, a system such as multiprocessor system 500 may implement a multi-drop interconnect or other such architecture.

Exemplary Core Architectures, Processors, and Computer Architectures.

Processor cores may be implemented in different ways, for different purposes, and in different processors. For instance, implementations of such cores may include: 1) a general purpose in-order core intended for general-purpose computing; 2) a high-performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput) computing. Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip (SoC) that may include on the same die as the described CPU (sometimes referred to as the application core(s) or application processor(s)), the above described coprocessor, and additional functionality. Exemplary core architectures are described next, followed by descriptions of exemplary processors and computer architectures.

Figure 6:
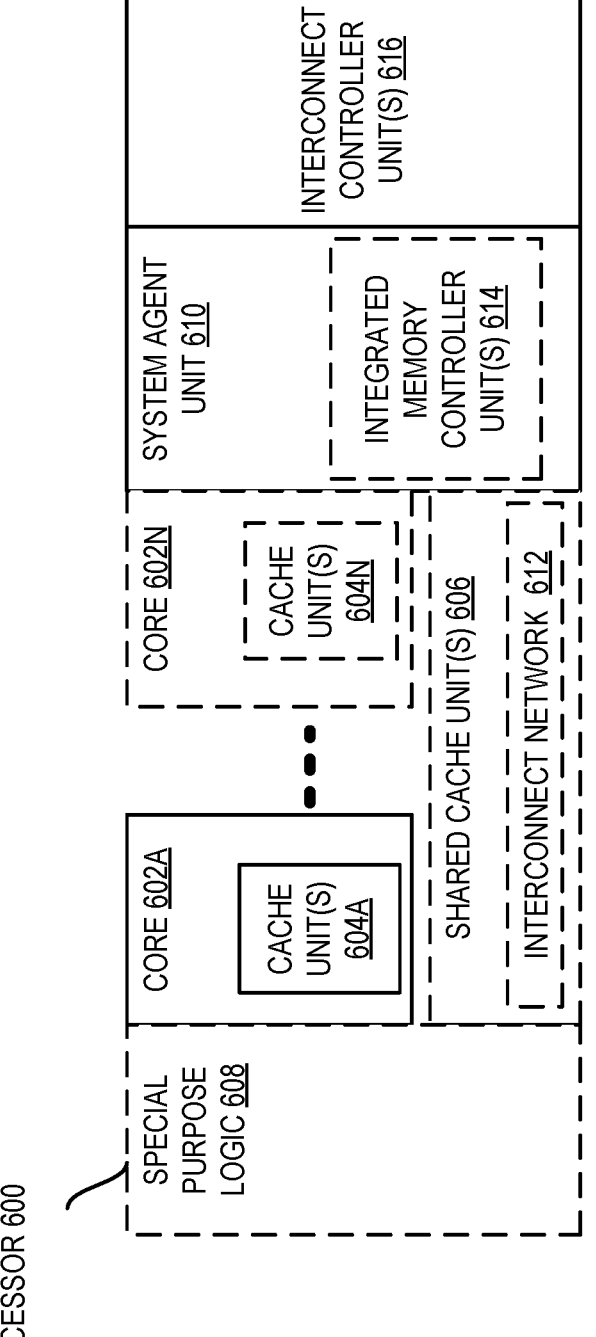
FIG. 6 illustrates a block diagram of an example processor that may have more than one core and an integrated memory controller.

FIG. 6 illustrates a block diagram of an example processor 600 that may have more than one core and an integrated memory controller. The solid lined boxes illustrate a processor 600 with a single core 602A, a system agent unit circuitry 610, a set of one or more interconnect controller unit(s) circuitry 616, while the optional addition of the dashed lined boxes illustrates an alternative processor 600 with multiple cores 602(A)-(N), a set of one or more integrated memory controller unit(s) circuitry 614 in the system agent unit circuitry 610, and special purpose logic 608, as well as a set of one or more interconnect controller units circuitry 616. Note that the processor 600 may be one of the processors 570 or 580, or co-processor 538 or 515 of FIG. 5.

Thus, different implementations of the processor 600 may include: 1) a CPU with the special purpose logic 608 being integrated graphics and/or scientific (throughput) logic (which may include one or more cores, not shown), and the cores 602(A)-(N) being one or more general purpose cores (e.g., general purpose in-order cores, general purpose out-of-order cores, or a combination of the two); 2) a coprocessor with the cores 602(A)-(N) being a large number of special purpose cores intended primarily for graphics and/or scientific (throughput); and 3) a coprocessor with the cores 602(A)-(N) being a large number of general purpose in-order cores. Thus, the processor 600 may be a general-purpose processor, coprocessor or special-purpose processor, such as, for example, a network or communication processor, compression engine, graphics processor, GPGPU (general purpose graphics processing unit circuitry), a high-throughput many integrated core (MIC) coprocessor (including 30 or more cores), embedded processor, or the like. The processor may be implemented on one or more chips. The processor 600 may be a part of and/or may be implemented on one or more substrates using any of a number of process technologies, such as, for example, complementary metal oxide semiconductor (CMOS), bipolar CMOS (BiCMOS), P-type metal oxide semiconductor (PMOS), or N-type metal oxide semiconductor (NMOS).

A memory hierarchy includes one or more levels of cache unit(s) circuitry 604(A)-(N) within the cores 602(A)-(N), a set of one or more shared cache unit(s) circuitry 606, and external memory (not shown) coupled to the set of integrated memory controller unit(s) circuitry 614. The set of one or more shared cache unit(s) circuitry 606 may include one or more mid-level caches, such as level 2 (L2), level 3 (L3), level 4 (L4), or other levels of cache, such as a last level cache (LLC), and/or combinations thereof. While in some examples ring-based interconnect network circuitry 612 interconnects the special purpose logic 608 (e.g., integrated graphics logic), the set of shared cache unit(s) circuitry 606, and the system agent unit circuitry 610, alternative examples use any number of well-known techniques for interconnecting such units. In some examples, coherency is maintained between one or more of the shared cache unit(s) circuitry 606 and cores 602(A)-(N).

In some examples, one or more of the cores 602(A)-(N) are capable of multi-threading. The system agent unit circuitry 610 includes those components coordinating and operating cores 602(A)-(N). The system agent unit circuitry 610 may include, for example, power control unit (PCU) circuitry and/or display unit circuitry (not shown). The PCU may be or may include logic and components needed for regulating the power state of the cores 602(A)-(N) and/or the special purpose logic 608 (e.g., integrated graphics logic). The display unit circuitry is for driving one or more externally connected displays.

The cores 602(A)-(N) may be homogenous in terms of instruction set architecture (ISA). Alternatively, the cores 602(A)-(N) may be heterogeneous in terms of ISA; that is, a subset of the cores 602(A)-(N) may be capable of executing an ISA, while other cores may be capable of executing only a subset of that ISA or another ISA.

Exemplary Core Architectures—in-Order and Out-of-Order Core Block Diagram.

Figure 7A:
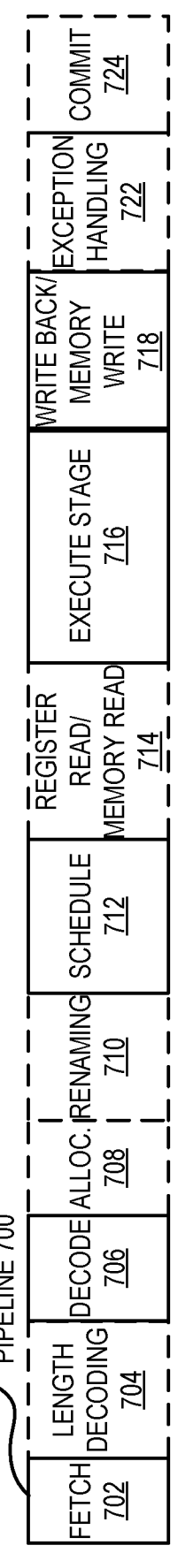
FIG. 7(A) is a block diagram illustrating both an exemplary in-order pipeline and an exemplary register renaming, out-of-order issue/execution pipeline according to examples.
Figure 7B:
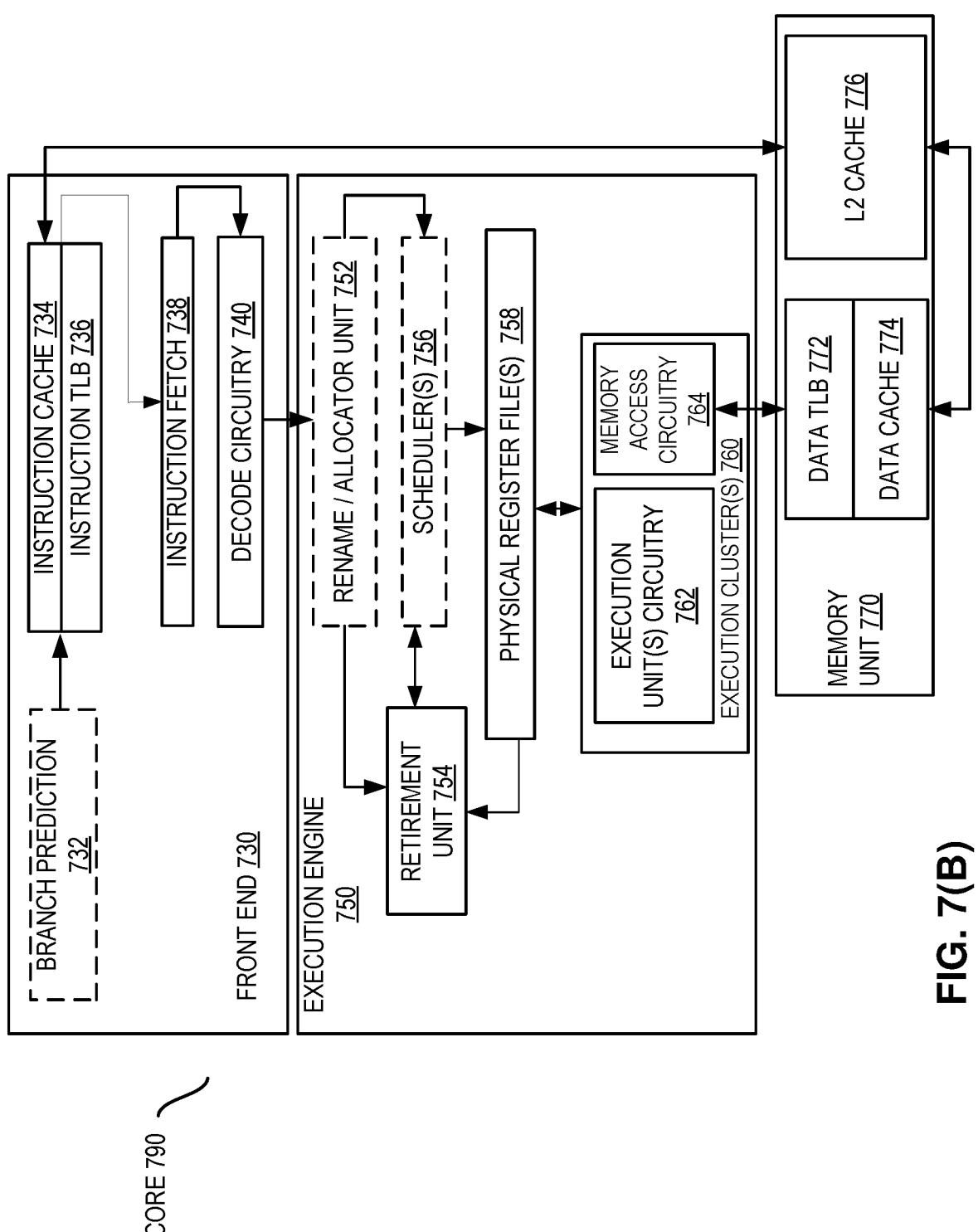
FIG. 7(B) is a block diagram illustrating both an exemplary example of an in-order architecture core and an exemplary register renaming, out-of-order issue/execution architecture core to be included in a processor according to examples.

FIG. 7(A) is a block diagram illustrating both an exemplary in-order pipeline and an exemplary register renaming, out-of-order issue/execution pipeline according to examples. FIG. 7(B) is a block diagram illustrating both an exemplary example of an in-order architecture core and an exemplary register renaming, out-of-order issue/execution architecture core to be included in a processor according to examples. The solid lined boxes in FIGS. 7(A)-(B) illustrate the in-order pipeline and in-order core, while the optional addition of the dashed lined boxes illustrates the register renaming, out-of-order issue/execution pipeline and core.

Given that the in-order aspect is a subset of the out-of-order aspect, the out-of-order aspect will be described.

In FIG. 7(A), a processor pipeline 700 includes a fetch stage 702, an optional length decoding stage 704, a decode stage 706, an optional allocation (Alloc) stage 708, an optional renaming stage 710, a schedule (also known as a dispatch or issue) stage 712, an optional register read/memory read stage 714, an execute stage 716, a write back/memory write stage 718, an optional exception handling stage 722, and an optional commit stage 724. One or more operations can be performed in each of these processor pipeline stages. For example, during the fetch stage 702, one or more instructions are fetched from instruction memory, and during the decode stage 706, the one or more fetched instructions may be decoded, addresses (e.g., load store unit (LSU) addresses) using forwarded register ports may be generated, and branch forwarding (e.g., immediate offset or a link register (LR)) may be performed. In one example, the decode stage 706 and the register read/memory read stage 714 may be combined into one pipeline stage. In one example, during the execute stage 716, the decoded instructions may be executed, LSU address/data pipelining to an Advanced Microcontroller Bus (AMB) interface may be performed, multiply and add operations may be performed, arithmetic operations with branch results may be performed, etc.

By way of example, the exemplary register renaming, out-of-order issue/execution architecture core of FIG. 7(B) may implement the pipeline 700 as follows: 1) the instruction fetch circuitry 738 performs the fetch and length decoding stages 702 and 704; 2) the decode circuitry 740 performs the decode stage 706; 3) the rename/allocator unit circuitry 752 performs the allocation stage 708 and renaming stage 710; 4) the scheduler(s) circuitry 756 performs the schedule stage 712; 5) the physical register file(s) circuitry 758 and the memory unit circuitry 770 perform the register read/memory read stage 714; the execution cluster(s) 760 perform the execute stage 716; 6) the memory unit circuitry 770 and the physical register file(s) circuitry 758 perform the write back/memory write stage 718; 7) various circuitry may be involved in the exception handling stage 722; and 8) the retirement unit circuitry 754 and the physical register file(s) circuitry 758 perform the commit stage 724.

FIG. 7(B) shows a processor core 790 including front-end unit circuitry 730 coupled to an execution engine unit circuitry 750, and both are coupled to a memory unit circuitry 770. The core 790 may be a reduced instruction set architecture computing (RISC) core, a complex instruction set architecture computing (CISC) core, a very long instruction word (VLIW) core, or a hybrid or alternative core type. As yet another option, the core 790 may be a special-purpose core, such as, for example, a network or communication core, compression engine, coprocessor core, general purpose computing graphics processing unit (GPGPU) core, graphics core, or the like.

The front end unit circuitry 730 may include branch prediction circuitry 732 coupled to an instruction cache circuitry 734, which is coupled to an instruction translation lookaside buffer (TLB) 736, which is coupled to instruction fetch circuitry 738, which is coupled to decode circuitry 740. In one example, the instruction cache circuitry 734 is included in the memory unit circuitry 770 rather than the front-end circuitry 730. The decode circuitry 740 (or decoder) may decode instructions, and generate as an output one or more micro-operations, micro-code entry points, microinstructions, other instructions, or other control signals, which are decoded from, or which otherwise reflect, or are derived from, the original instructions. The decode circuitry 740 may further include an address generation unit (AGU, not shown) circuitry. In one example, the AGU generates an LSU address using forwarded register ports, and may further perform branch forwarding (e.g., immediate offset branch forwarding, LR register branch forwarding, etc.). The decode circuitry 740 may be implemented using various different mechanisms. Examples of suitable mechanisms include, but are not limited to, look-up tables, hardware implementations, programmable logic arrays (PLAs), microcode read only memories (ROMs), etc. In one example, the core 790 includes a microcode ROM (not shown) or other medium that stores microcode for certain macroinstructions (e.g., in decode circuitry 740 or otherwise within the front end circuitry 730). In one example, the decode circuitry 740 includes a micro-operation (micro-op) or operation cache (not shown) to hold/cache decoded operations, micro-tags, or micro-operations generated during the decode or other stages of the processor pipeline 700. The decode circuitry 740 may be coupled to rename/allocator unit circuitry 752 in the execution engine circuitry 750.

The execution engine circuitry 750 includes the rename/allocator unit circuitry 752 coupled to a retirement unit circuitry 754 and a set of one or more scheduler(s) circuitry 756. The scheduler(s) circuitry 756 represents any number of different schedulers, including reservations stations, central instruction window, etc. In some examples, the scheduler(s) circuitry 756 can include arithmetic logic unit (ALU) scheduler/scheduling circuitry, ALU queues, arithmetic generation unit (AGU) scheduler/scheduling circuitry, AGU queues, etc. The scheduler(s) circuitry 756 is coupled to the physical register file(s) circuitry 758. Each of the physical register file(s) circuitry 758 represents one or more physical register files, different ones of which store one or more different data types, such as scalar integer, scalar floating-point, packed integer, packed floating-point, vector integer, vector floating-point, status (e.g., an instruction pointer that is the address of the next instruction to be executed), etc. In one example, the physical register file(s) circuitry 758 includes vector registers unit circuitry, writemask registers unit circuitry, and scalar register unit circuitry. These register units may provide architectural vector registers, vector mask registers, general-purpose registers, etc. The physical register file(s) circuitry 758 is coupled to the retirement unit circuitry 754 (also known as a retire queue or a retirement queue) to illustrate various ways in which register renaming and out-of-order execution may be implemented (e.g., using a reorder buffer(s) (ROB(s)) and a retirement register file(s); using a future file(s), a history buffer(s), and a retirement register file(s); using a register maps and a pool of registers; etc.). The retirement unit circuitry 754 and the physical register file(s) circuitry 758 are coupled to the execution cluster(s) 760. The execution cluster(s) 760 includes a set of one or more execution unit(s) circuitry 762 and a set of one or more memory access circuitry 764. The execution unit(s) circuitry 762 may perform various arithmetic, logic, floating-point or other types of operations (e.g., shifts, addition, subtraction, multiplication) and on various types of data (e.g., scalar integer, scalar floating-point, packed integer, packed floating-point, vector integer, vector floating-point). While some examples may include a number of execution units or execution unit circuitry dedicated to specific functions or sets of functions, other examples may include only one execution unit circuitry or multiple execution units/execution unit circuitry that all perform all functions. The scheduler(s) circuitry 756, physical register file(s) circuitry 758, and execution cluster(s) 760 are shown as being possibly plural because certain examples create separate pipe-
lines for certain types of data/operations (e.g., a scalar
integer pipeline, a scalar floating-point/packed integer/
packed floating-point/vector integer/vector floating-point
pipeline, and/or a memory access pipeline that each have
their own scheduler circuitry, physical register file(s) cir-
cuitry, and/or execution cluster—and in the case of a sepa-
rate memory access pipeline, certain examples are imple-
mented in which only the execution cluster of this pipeline
has the memory access unit(s) circuitry 764). It should also
be understood that where separate pipelines are used, one or
more of these pipelines may be out-of-order issue/execution
and the rest in-order.

In some examples, the execution engine unit circuitry 750
may perform load store unit (LSU) address/data pipelining
to an Advanced Microcontroller Bus (AMB) interface (not
shown), and address phase and writeback, data phase load,
store, and branches.

The set of memory access circuitry 764 is coupled to the
memory unit circuitry 770, which includes data TLB cir-
cuitry 772 coupled to a data cache circuitry 774 coupled to
a level 2 (L2) cache circuitry 776. In one exemplary
example, the memory access circuitry 764 may include a
load unit circuitry, a store address unit circuit, and a store
data unit circuitry, each of which is coupled to the data TLB
circuitry 772 in the memory unit circuitry 770. The instruc-
tion cache circuitry 734 is further coupled to the level 2 (L2)
cache circuitry 776 in the memory unit circuitry 770. In one
example, the instruction cache 734 and the data cache 774
are combined into a single instruction and data cache (not
shown) in L2 cache circuitry 776, a level 3 (L3) cache
circuitry (not shown), and/or main memory. The L2 cache
circuitry 776 is coupled to one or more other levels of cache
and eventually to a main memory.

The core 790 may support one or more instructions sets
(e.g., the x86 instruction set architecture (optionally with
some extensions that have been added with newer versions);
the MIPS instruction set architecture; the ARM instruction
set architecture (optionally with optional additional exten-
sions such as NEON)), including the instruction(s) described
herein. In one example, the core 790 includes logic to
support a packed data instruction set architecture extension
(e.g., AVX1, AVX2), thereby allowing the operations used
by many multimedia applications to be performed using
packed data.

Exemplary Execution Unit(s) Circuitry.

Figure 8:
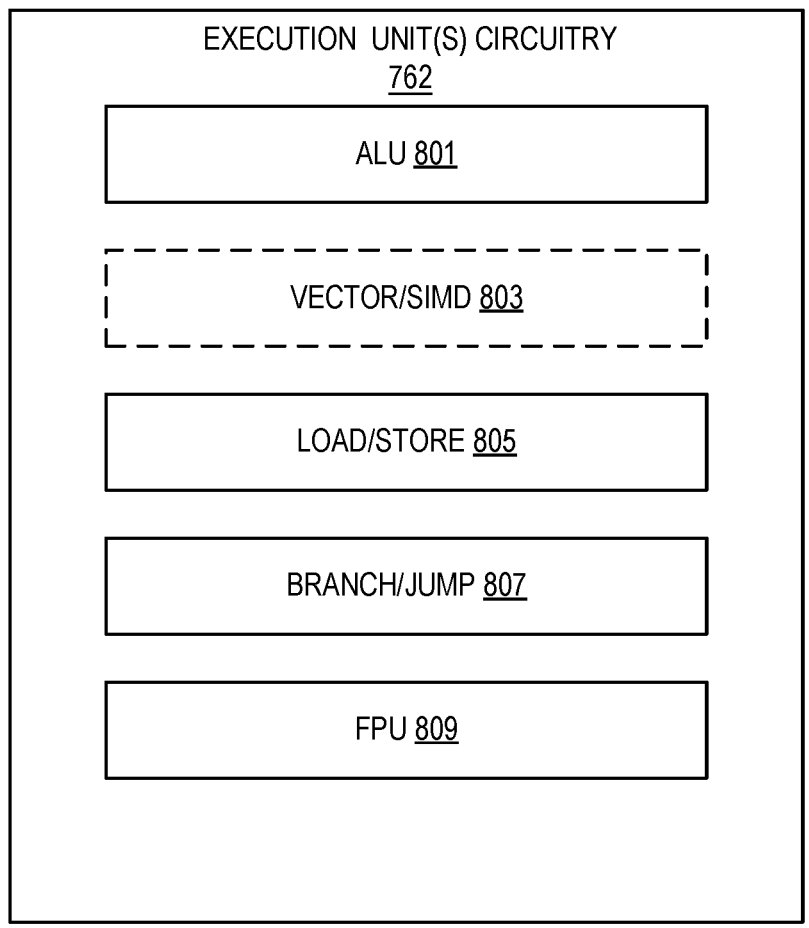
FIG. 8 illustrates examples of execution unit(s) circuitry.

FIG. 8 illustrates examples of execution unit(s) circuitry,
such as execution unit(s) circuitry 762 of FIG. 7(B). As
illustrated, execution unit(s) circuitry 762 may include one
or more ALU circuits 801, optional vector/single instruction
multiple data (SIMD) circuits 803, load/store circuits 805,
branch/jump circuits 807, and/or Floating-point unit (FPU)
circuits 809. ALU circuits 801 perform integer arithmetic
and/or Boolean operations. Vector/SIMD circuits 803 per-
form vector/SIMD operations on packed data (such as
SIMD/vector registers). Load/store circuits 805 execute load
and store instructions to load data from memory into regis-
ters or store from registers to memory. Load/store circuits
805 may also generate addresses. Branch/jump circuits 807
cause a branch or jump to a memory address depending on
the instruction. FPU circuits 809 perform floating-point
arithmetic. The width of the execution unit(s) circuitry 762
varies depending upon the example and can range from
16-bit to 1,024-bit, for example. In some examples, two or
more smaller execution units are logically combined to form
a larger execution unit (e.g., two 128-bit execution units are
logically combined to form a 256-bit execution unit).

Exemplary Register Architecture

FIG. 9 is a block diagram of a register architecture 900
according to some examples. As illustrated, the register
architecture 900 includes vector/SIMD registers 910 that
vary from 128-bit to 1,024 bits width. In some examples, the
vector/SIMD registers 910 are physically 512-bits and,
depending upon the mapping, only some of the lower bits
are used. For example, in some examples, the vector/SIMD
registers 910 are ZMM registers which are 512 bits: the
lower 256 bits are used for YMM registers and the lower 128
bits are used for XMM registers. As such, there is an overlay
of registers. In some examples, a vector length field selects
between a maximum length and one or more other shorter
lengths, where each such shorter length is half the length of
the preceding length. Scalar operations are operations per-
formed on the lowest order data element position in a
ZMM/YMM/XMM register; the higher order data element
positions are either left the same as they were prior to the
instruction or zeroed depending on the example.

In some examples, the register architecture 900 includes
writemask/predicate registers 915. For example, in some
examples, there are 8 writemask/predicate registers (some-
times called k0 through k7) that are each 16-bit, 32-bit,
64-bit, or 128-bit in size. Writemask/predicate registers 915
may allow for merging (e.g., allowing any set of elements in
the destination to be protected from updates during the
execution of any operation) and/or zeroing (e.g., zeroing
vector masks allow any set of elements in the destination to
be zeroed during the execution of any operation). In some
examples, each data element position in a given writemask/
predicate register 915 corresponds to a data element position
of the destination. In other examples, the writemask/predi-
cate registers 915 are scalable and consists of a set number
of enable bits for a given vector element (e.g., 8 enable bits
per 64-bit vector element).

The register architecture 900 includes a plurality of gen-
eral-purpose registers 925. These registers may be 16-bit,
32-bit, 64-bit, etc. and can be used for scalar operations. In
some examples, these registers are referenced by the names
RAX, RBX, RCX, RDX, RBP, RSI, RDI, RSP, and R8
through R15.

In some examples, the register architecture 900 includes
scalar floating-point (FP) register 945 which is used for
scalar floating-point operations on 32/64/80-bit floating-
point data using the x87 instruction set architecture exten-
sion or as MMX registers to perform operations on 64-bit
packed integer data, as well as to hold operands for some
operations performed between the MMX and XMM regis-
ters.

One or more flag registers 940 (e.g., EFLAGS, RFLAGS,
etc.) store status and control information for arithmetic,
compare, and system operations. For example, the one or
more flag registers 940 may store condition code informa-
tion such as carry, parity, auxiliary carry, zero, sign, and
overflow. In some examples, the one or more flag registers
940 are called program status and control registers.

Segment registers 920 contain segment points for use in
accessing memory. In some examples, these registers are
referenced by the names CS, DS, SS, ES, FS, and GS.

Machine specific registers (MSRs) 935 control and report
on processor performance. Most MSRs 935 handle system-
related functions and are not accessible to an application
program. Machine check registers 960 consist of control,
status, and error reporting MSRs that are used to detect and
report on hardware errors.

One or more instruction pointer register(s) 930 store an
instruction pointer value. Control register(s) 955 (e.g., CR0-

CR4) determine the operating mode of a processor (e.g., processor 570, 580, 538, 515, and/or 600) and the characteristics of a currently executing task. Debug registers 950 control and allow for the monitoring of a processor or core's debugging operations.

Memory (mem) management registers 965 specify the locations of data structures used in protected mode memory management. These registers may include a GDTR, IDRT, task register, and a LDTR register.

Alternative examples may use wider or narrower registers. Additionally, alternative examples may use more, less, or different register files and registers. The register architecture 900 may, for example, be used in physical register file(s) circuitry 758.

Program code may be applied to input information to perform the functions described herein and generate output information. The output information may be applied to one or more output devices, in known fashion. For purposes of this application, a processing system includes any system that has a processor, such as, for example, a digital signal processor (DSP), a microcontroller, an application specific integrated circuit (ASIC), a field programmable gate array (FPGA), a microprocessor, or any combination thereof.

The program code may be implemented in a high-level procedural or object-oriented programming language to communicate with a processing system. The program code may also be implemented in assembly or machine language, if desired. In fact, the mechanisms described herein are not limited in scope to any particular programming language. In any case, the language may be a compiled or interpreted language.

Examples of the mechanisms disclosed herein may be implemented in hardware, software, firmware, or a combination of such implementation approaches. Examples may be implemented as computer programs or program code executing on programmable systems comprising at least one processor, a storage system (including volatile and non-volatile memory and/or storage elements), at least one input device, and at least one output device.

One or more aspects of at least one example may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, examples also include non-transitory, tangible machine-readable media containing instructions or containing design data, such as Hardware Description Language (HDL), which defines structures, circuits, apparatuses, processors and/or system features described herein. Such examples may also be referred to as program products. Emulation (Including Binary Translation, Code Morphing, Etc.).

In some cases, an instruction converter may be used to convert an instruction from a source instruction set architecture to a target instruction set architecture. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 10:
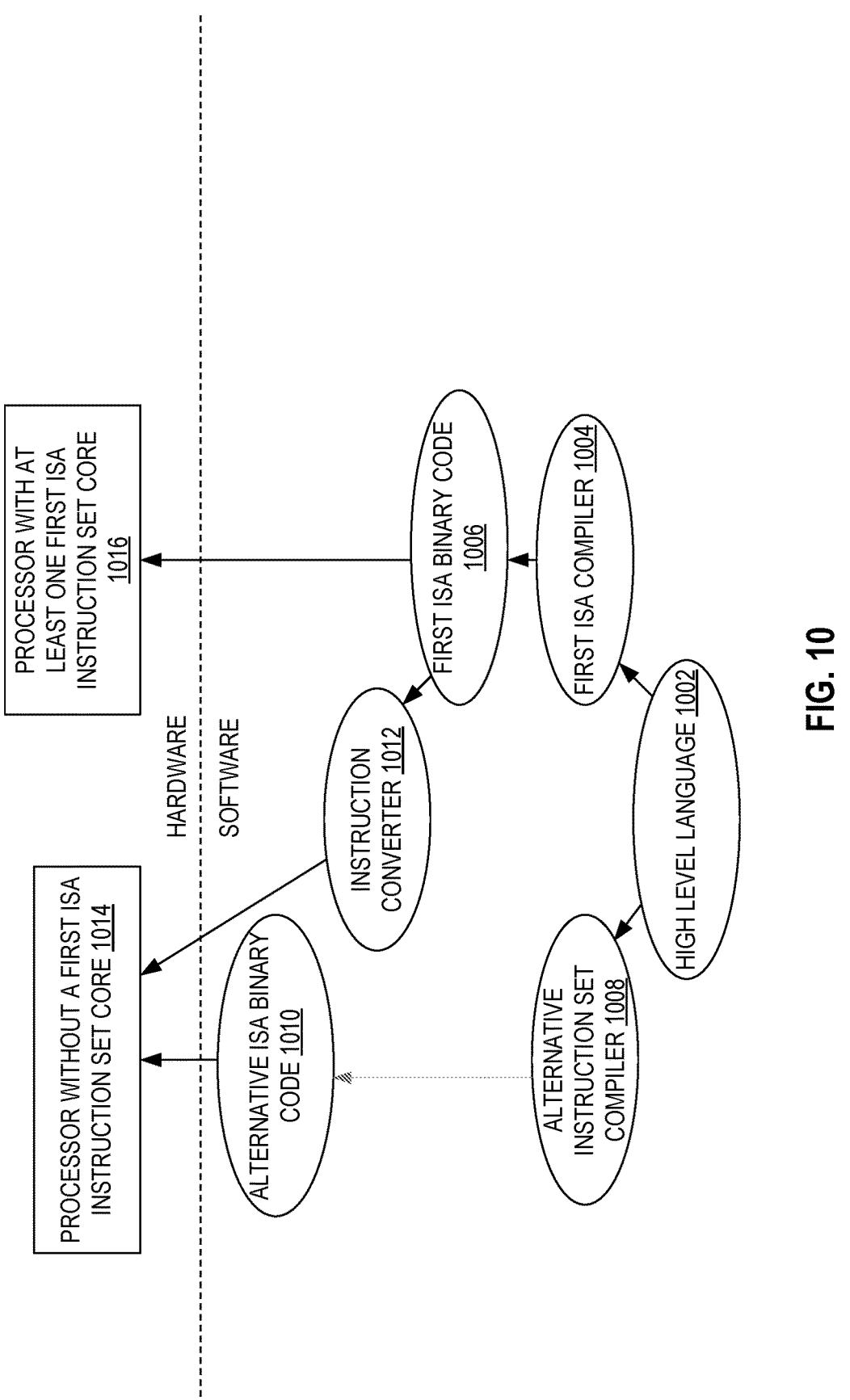
FIG. 10 is a block diagram illustrating the use of a software instruction converter to convert binary instructions in a source instruction set architecture to binary instructions in a target instruction set architecture according to examples.

FIG. 10 illustrates a block diagram contrasting the use of a software instruction converter to convert binary instructions in a source instruction set architecture to binary instructions in a target instruction set architecture according to examples. In the illustrated example, the instruction converter is a software instruction converter, although alternatively the instruction converter may be implemented in software, firmware, hardware, or various combinations thereof. FIG. 10 shows a program in a high-level language 1002 may be compiled using a first ISA compiler 1004 to generate first ISA binary code 1006 that may be natively executed by a processor with at least one first instruction set architecture core 1016. The processor with at least one first ISA instruction set architecture core 1016 represents any processor that can perform substantially the same functions as an Intel® processor with at least one first ISA instruction set architecture core by compatibly executing or otherwise processing (1) a substantial portion of the instruction set architecture of the first ISA instruction set architecture core or (2) object code versions of applications or other software targeted to run on an Intel processor with at least one first ISA instruction set architecture core, in order to achieve substantially the same result as a processor with at least one first ISA instruction set architecture core. The first ISA compiler 1004 represents a compiler that is operable to generate first ISA binary code 1006 (e.g., object code) that can, with or without additional linkage processing, be executed on the processor with at least one first ISA instruction set architecture core 1016.

Similarly, FIG. 10 shows the program in the high-level language 1002 may be compiled using an alternative instruction set architecture compiler 1008 to generate alternative instruction set architecture binary code 1010 that may be natively executed by a processor without a first ISA instruction set architecture core 1014. The instruction converter 1012 is used to convert the first ISA binary code 1006 into code that may be natively executed by the processor without a first ISA instruction set architecture core 1014. This converted code is not necessarily to be the same as the alternative instruction set architecture binary code 1010; however, the converted code will accomplish the general operation and be made up of instructions from the alternative instruction set architecture. Thus, the instruction converter 1012 represents software, firmware, hardware, or a combination thereof that, through emulation, simulation or any other process, allows a processor or other electronic device that does not have a first ISA instruction set architecture processor or core to execute the first ISA binary code 1006.

The following examples pertain to further embodiments.

In one example, an apparatus includes: a branch prediction circuit to predict whether a branch is to be taken; a fetch circuit coupled to the branch prediction circuit, where the fetch circuit, in a single fetch cycle, is to send a first portion of a fetch region of instructions to a first decode cluster and send a second portion of the fetch region to a second decode cluster when the fetch region comprises multiple predictions; the first decode cluster coupled to the fetch circuit, the first decode cluster comprising a first plurality of decode circuits to decode one or more instructions in the first portion of the fetch region; and the second decode cluster coupled to the fetch circuit, the second decode cluster comprising a second plurality of decode circuits to decode one or more other instructions in the second portion of the fetch region.

In an example, the fetch region comprises a first branch and a second branch.

In an example, the apparatus further comprises a first branch prediction queue coupled to the first decode cluster and a second branch prediction queue coupled to the second decode cluster.

In an example: the first portion of the fetch region comprises a start of the fetch region as a start point and an end of a first branch instruction comprising the first branch as an endpoint; and the second portion of the fetch region comprises a start of a first branch target of the first branch.

In an example, the branch prediction circuit comprises memory to store a branch target buffer, the branch target buffer to store a plurality of entries, where each entry comprises a first field to store a branch target of a branch and a second field to store a double prediction indicator to indicate whether the branch is associated with a fetch region of instructions having a double prediction.

In an example, the branch prediction circuit is to allocate a first entry into the branch target buffer with the double prediction indicator of the second field set to indicate whether the branch is associated with a fetch region of instructions having a double prediction.

In an example, the branch prediction circuit is to set the double prediction indicator of the second field based at least in part on one or more characteristics of the branch.

In an example, the one or more characteristics comprise a distance between the branch and the branch target.

In an example, if the distance exceeds a threshold distance, the branch prediction circuit is to store in the second field a single prediction indicator to indicate that the branch is not associated with a fetch region of instructions having the double prediction.

In an example, the apparatus further comprises an allocation circuit coupled to the first decode cluster and the second decode cluster, where the first decode cluster and the second decode cluster are to decode instructions out of order and the allocation circuit is to reorder the decoded instructions.

In another example, a method comprises: receiving, in a branch target buffer of a processor, branch information of a branch instruction; storing at least a portion of the branch information in an entry of the branch target buffer with a first indicator when a fetch region including the branch instruction includes a target of the branch instruction; and storing at least the portion of the branch information in the entry of the branch target buffer with a second indicator when the fetch region does not include the target of the branch instruction.

In an example, the method further comprises, in a single fetch cycle, based at least in part on the first indicator: sending at least a first portion of the fetch region to a first decode cluster comprising a first plurality of decoder circuits; and sending at least a second portion of the fetch region to a second decode cluster comprising a second plurality of decoder circuits.

In an example, the method further comprises: storing at least the first portion of the fetch region in a first branch prediction queue; and storing at least the second portion of the fetch region in a second branch prediction queue.

In an example, the method further comprises: sending from the first branch prediction queue at least the first portion of the fetch region to the first decode cluster; and sending from the second branch prediction queue at least the second portion of the fetch region to the second decode cluster.

In an example, the method further comprises: including in at least the first portion of the fetch region a start of the fetch region as a start point and an end of a first branch instruction as an endpoint; and including in at least the second portion of the fetch region a start of a first branch target of the first branch instruction.

In an example, the method further comprises, in a single fetch cycle, based at least in part on the second indicator: sending at least a portion of the fetch region to a first decode cluster comprising a first plurality of decoder circuits, and not sending any portion of the fetch region to a second decode cluster comprising a second plurality of decoder circuits.

In another example, a computer readable medium including instructions is to perform the method of any of the above examples.

In a further example, a computer readable medium including data is to be used by at least one machine to fabricate at least one integrated circuit to perform the method of any one of the above examples.

In a still further example, an apparatus comprises means for performing the method of any one of the above examples.

In another example, an apparatus comprises: means for receiving branch information of a branch instruction; means for storing at least a portion of the branch information in entry means of a branch target means with a first indicator when a fetch region including the branch instruction includes a target of the branch instruction; and means for storing at least the portion of the branch information in the entry means with a second indicator when the fetch region does not include the target of the branch instruction.

In an example, the apparatus further comprises: means for sending at least a first portion of the fetch region to first decode cluster means; and means for sending at least a second portion of the fetch region to second decode cluster means.

In an example, the apparatus further comprises: means for storing at least the first portion of the fetch region in first branch prediction queue means; and means for storing at least the second portion of the fetch region in second branch prediction queue means.

In an example, the apparatus further comprises: means for sending at least a portion of the fetch region to first decode cluster means, and means for preventing any portion of the fetch region from being sent to second decode cluster means.

In yet another example, a processor comprises: a branch prediction circuit to identify a first branch and a second branch within a fetch region of code, where when the fetch region comprises a target of the first branch the branch prediction circuit is to identify a double prediction in the fetch region; a fetch circuit coupled to the branch prediction circuit, where in response to the double prediction identification, the fetch circuit, in a single fetch cycle, is to send a first portion of the fetch region to a first decode cluster and send a second portion of the fetch region to a second decode cluster; the first decode cluster coupled to the fetch circuit, the first decode cluster comprising a first plurality of decode circuits to decode one or more instructions in the first portion of the fetch region; and the second decode cluster coupled to the fetch circuit, the second decode cluster comprising a second plurality of decode circuits to decode one or more other instructions in the second portion of the fetch region concurrently with the first decode cluster decoding of the one or more instructions in the first portion of the fetch region.

In an example, the processor further comprises an allocation circuit coupled to the first decode cluster and the second decode cluster, where the allocation circuit is to reorder at least some of the decoded one or more instructions in the first portion of the fetch region and the one or more other instructions in the second portion of the fetch region.

In an example, the branch prediction circuit comprises memory to store a branch target buffer, the branch target buffer to store a plurality of entries, each of the plurality of entries associated with a branch, where each entry comprises a first field to store a target and a second field to store a double prediction indicator to indicate whether the branch is associated with the double prediction.

In an example, the fetch circuit is to send the first portion of the fetch region to the first decode cluster and send the second portion of the fetch region to the second decode cluster when the first portion of the fetch region comprises a start of the fetch region and the first branch and the second portion of the fetch region comprises the target of the first branch.

Understand that various combinations of the above examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. An apparatus comprising:
   a branch prediction circuit to predict whether a branch is to be taken;
   a fetch circuit coupled to the branch prediction circuit, wherein the fetch circuit, in a single fetch cycle, is to send a first portion of a fetch region of instructions to a first decode cluster and send a second portion of the fetch region to a second decode cluster when the fetch region comprises multiple predictions;
   the first decode cluster coupled to the fetch circuit, the first decode cluster comprising a first plurality of decode circuits to decode one or more instructions in the first portion of the fetch region; and
   the second decode cluster coupled to the fetch circuit, the second decode cluster comprising a second plurality of decode circuits to decode one or more other instructions in the second portion of the fetch region.

2. The apparatus of claim 1, wherein the fetch region comprises a first branch and a second branch.

3. The apparatus of claim 1, further comprising a first branch prediction queue coupled to the first decode cluster and a second branch prediction queue coupled to the second decode cluster.

4. The apparatus of claim 3, wherein:
   the first portion of the fetch region comprises a start of the fetch region as a start point and an end of a first branch instruction comprising the first branch as an endpoint; and
   the second portion of the fetch region comprises a start of a first branch target of the first branch.

5. The apparatus of claim 1, wherein the branch prediction circuit comprises memory to store a branch target buffer, the branch target buffer to store a plurality of entries, wherein each entry comprises a first field to store a branch target of a branch and a second field to store a double prediction indicator to indicate whether the branch is associated with a fetch region of instructions having a double prediction.

6. The apparatus of claim 5, wherein the branch prediction circuit is to allocate a first entry into the branch target buffer with the double prediction indicator of the second field set to indicate whether the branch is associated with a fetch region of instructions having a double prediction.

7. The apparatus of claim 6, wherein the branch prediction circuit is to set the double prediction indicator of the second field based at least in part on one or more characteristics of the branch.

8. The apparatus of claim 7, wherein the one or more characteristics comprise a distance between the branch and the branch target.

9. The apparatus of claim 8, wherein if the distance exceeds a threshold distance, the branch prediction circuit is to store in the second field a single prediction indicator to indicate that the branch is not associated with a fetch region of instructions having the double prediction.

10. The apparatus of claim 1, further comprising an allocation circuit coupled to the first decode cluster and the second decode cluster, wherein the first decode cluster and the second decode cluster are to decode instructions out of order and the allocation circuit is to reorder the decoded instructions.

11. A processor comprising:
   a branch prediction circuit to identify a first branch and a second branch within a fetch region of code, wherein when the fetch region comprises a target of the first branch, the branch prediction circuit is to identify a double prediction in the fetch region;
   a fetch circuit coupled to the branch prediction circuit, wherein in response to the double prediction identification, the fetch circuit, in a single fetch cycle, is to send a first portion of the fetch region to a first decode cluster and send a second portion of the fetch region to a second decode cluster;
   the first decode cluster coupled to the fetch circuit, the first decode cluster comprising a first plurality of decode circuits to decode one or more instructions in the first portion of the fetch region; and the second decode cluster coupled to the fetch circuit, the second decode cluster comprising a second plurality of decode circuits to decode one or more other instructions in the second portion of the fetch region concurrently with the first decode cluster decoding of the one or more instructions in the first portion of the fetch region.

12. The processor of claim 11, further comprising an allocation circuit coupled to the first decode cluster and the second decode cluster, wherein the allocation circuit is to reorder at least some of the decoded one or more instructions in the first portion of the fetch region and the one or more other instructions in the second portion of the fetch region.

13. The processor of claim 11, wherein the branch prediction circuit comprises memory to store a branch target buffer, the branch target buffer to store a plurality of entries, each of the plurality of entries associated with a branch, wherein each entry comprises a first field to store a target and a second field to store a double prediction indicator to indicate whether the branch is associated with the double prediction.

14. The processor of claim 13, wherein the fetch circuit is to send the first portion of the fetch region to the first decode cluster and send the second portion of the fetch region to the second decode cluster when the first portion of the fetch region comprises a start of the fetch region and the first branch and the second portion of the fetch region comprises the target of the first branch.

* * * * *